(12) United States Patent
Gancarcik

(10) Patent No.: US 6,411,711 B1
(45) Date of Patent: Jun. 25, 2002

(54) COMBINATION CONNECTOR AND MICROPHONE

(75) Inventor: Ed Gancarcik, Ottawa (CA)

(73) Assignee: Mitel Corporation, Ontario (CA)

( * ) Notice: Subject to any disclaimer, the term of this patent is extended or adjusted under 35 U.S.C. 154(b) by 0 days.

(21) Appl. No.: 09/478,646

(22) Filed: Jan. 6, 2000

(30) Foreign Application Priority Data

Jan. 12, 1999 (GB) .............................................. 9900633

(51) Int. Cl.[7] .............................................. H04M 1/00

(52) U.S. Cl. ............. 379/438; 379/433.03; 379/420.03; 379/428.02

(58) Field of Search ............................ 379/438, 420.03, 379/428.02, 428.04, 433.03, 420.04

(56) References Cited

U.S. PATENT DOCUMENTS 5,487,182 A * 1/1996 Hansson ................ 379/420.04

* cited by examiner

Primary Examiner—Jack Chiang
(74) Attorney, Agent, or Firm—Jones, Day, Reavis & Pogue

(57) ABSTRACT

Conventional telephone sets normally include a microphone housing defining an opening to the exterior which communicates with a cavity in the microphone housing within which is located an internal microphone, and leads connecting the internal microphone with a PCB. An improvement is proposed, namely the provision of an external microphone connected to a plug which is receivable snugly within the opening, thus to substantially block external sound from reaching the internal microphone. Contact devices link the PCB with portions of the plug and thus with the external microphone.

9 Claims, 2 Drawing Sheets

COMBINATION CONNECTOR AND MICROPHONE

BACKGROUND OF THIS INVENTION

Many telephone sets, particularly those used in business, are provided with an internal microphone for handsfree operation, this typically taking the form of a microphone housing incorporated into the telephone set, the housing defining an opening to the exterior, the opening communicating the exterior with an internal cavity within which is located an internal microphone. Leads connect the internal microphone with an adjacent printed circuit board (PCB).

It is desirable to increase the acoustic performance of a handsfree telephone set. For example, in typically noisy or acoustically "live" environments, it is expected to be of substantial benefit to disconnect or disable the internal handsfree microphone normally supplied along with the telephone set, and to attach instead an external microphone which can be positioned in a preferred location. It has been found that increasing the acoustic separation between the microphone and the speaker makes full duplex handsfree algorithms much more effective.

Finding a way for this to occur has been a challenge in the industry, since it is desirable to avoid increasing the cost of the product. For example, prior art methods for providing this versatility have involved the provision of a separate connector in a physically different place on the product. Thus, the product would have the conventional opening leading to the on-board microphone, along with a separate connector—a complication that increases the cost of manufacture.

GENERAL DESCRIPTION OF THIS INVENTION

The procedure to be described below allows either a) a microphone to be used in a regular half-duplex speaker phone or b) a full duplex speaker phone telephone set, without any modification of the external plastic housing.

More particularly, this invention provides, in a telephone set which includes a microphone housing defining an opening that communicates with a cavity in the microphone housing within which is located an internal microphone, and leads connecting the internal microphone with a PCB, the improvement comprising:

an external microphone connected to a plug which is receivable snugly within said opening, thereby to substantially block external sound from reaching said internal microphone, and contact means linking the PCB with portions of the plug and thus with the external microphone.

In addition, this invention provides, in combination, a telephone set which includes a microphone housing defining an opening which communicates with a cavity in the microphone housing, an internal microphone located in said cavity, leads connecting the internal microphone with a PCB, and an external microphone connected to a plug receivable snugly within said opening, thereby to substantially block external sound from reaching the internal microphone, and contact means linking the PCB with portions of the plug, and thus with the external microphone.

Further, this invention provides a method of increasing the microphone options for a telephone set, the telephone set including a microphone housing defining an opening which communicates the exterior with a cavity in the microphone housing within which is located an internal microphone, and leads connecting the internal microphone with a PCB, said method including:

a) providing an external microphone connected to a plug which is receivable within said opening snugly enough to substantially block external sound from reaching said internal microphone, b) providing contact means for linking the PCB with portions of the plug and thus with the external microphone, c) inserting the plug into the opening whenever it is desired to use said external microphone, and d) removing the plug from the opening whenever it is desired to use said internal microphone.

GENERAL DESCRIPTION OF THE DRAWINGS

Two embodiments of this invention are illustrated in the accompanying drawings, in which like numerals denote like parts through the several views, and in which.

DETAILED DESCRIPTION OF THE DRAWINGS

Figure 1:
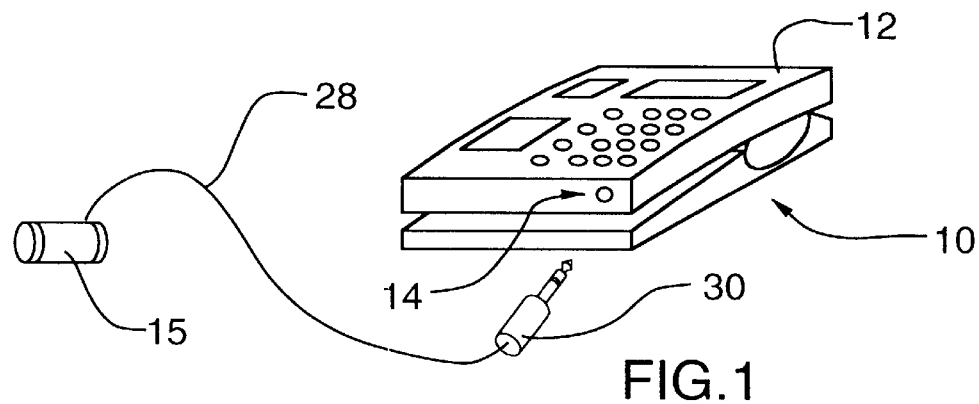
FIG. 1 is a perspective view of a telephone set and a separate microphone to be used therewith.
Figure 2:
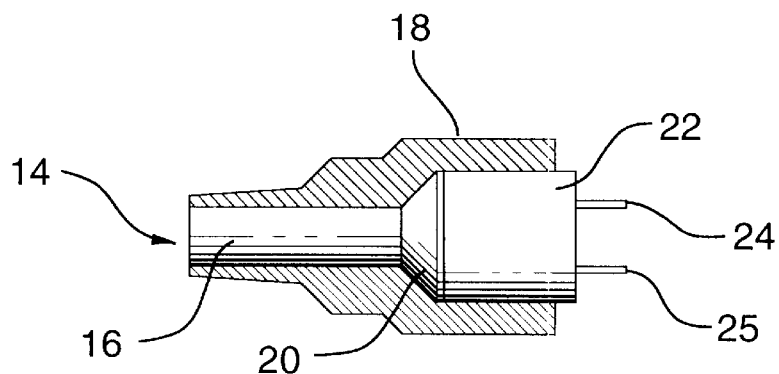
FIG. 2 is a sectional view through a microphone housing which is part of a telephone set, the housing being seen in axial section, showing the position of the typical on-board handsfree microphone.

Turning first to FIG. 1, there is shown a telephone set 10 incorporating a housing 12 defining an opening 14 which, as seen in FIG. 2, is the end of an axial passageway 16 in a microphone housing 18. The passageway 16 communicates with a cavity 20 in the microphone housing 18 within which is located a standard internal microphone 22. Leads 24 and 25 are adapted to connect the internal microphone to a printed circuit board (PCB).

As can be seen in the figures, the external microphone 15 is connected by a standard cable 28 to a plug 30 which is adapted to be snugly received within the passageway 16, by inserting it through the opening 14. The snug reception of the plug 30 within the passageway 16 substantially blocks external sound from reaching the internal microphone 22. It must be understood that FIG. 2 does not represent an embodiment of this invention, because, even with the plug 30 received in the passageway 16, there would be no electrical connection between the plug 30 and the PCB.

Figure 4:
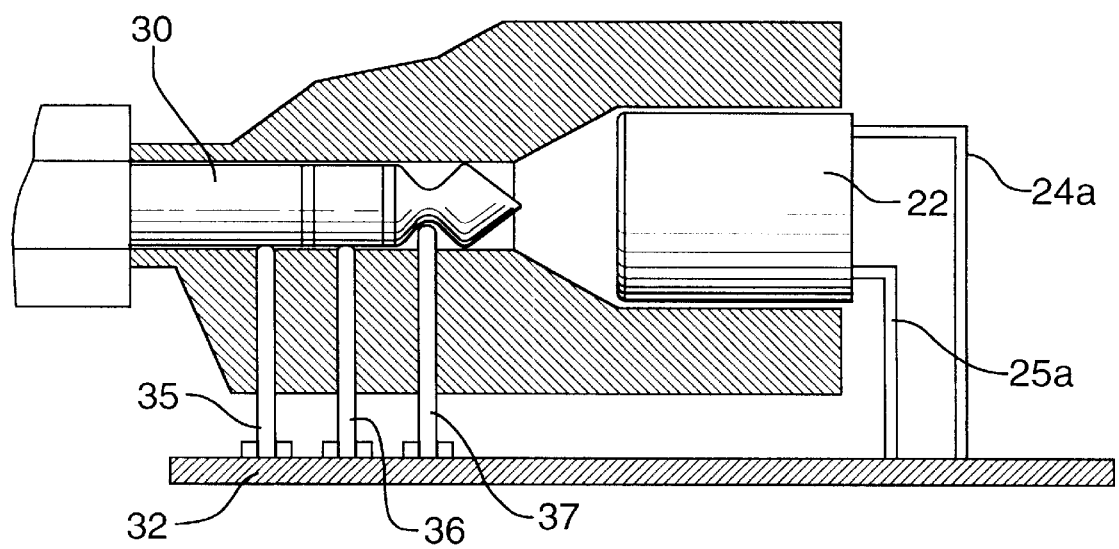
FIG. 4 shows an axial section through a microphone housing of the second embodiment.

FIG. 4 is an axial section through an embodiment which overcomes the foregoing problem by providing contact means linking the PCB 32 with appropriate portions of the plug 30.

More particularly, the electrical connection is made by way of three upstanding posts 35, 36 and 37, mounted securely on the PCB 32, and extending into resilient contact with appropriate portions of the plug 30. It is to be noted that the leads 24a and 25a are shown, in FIG. 4, to extend to connecting points on the PCB 32.

Thus, the method described above allows either a regular half-duplex speaker phone mike or a full duplex microphone option to be accommodated by the telephone set without modification of the plastic housing of the telephone set.

Figure 3:
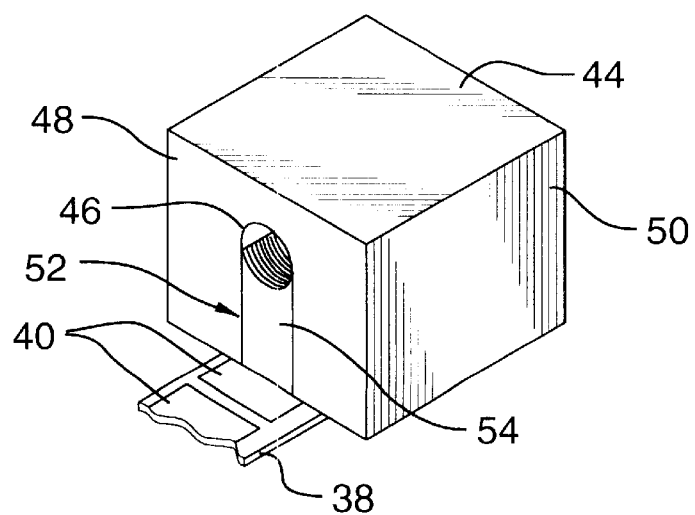
FIG. 3 is a perspective view of a portion of the first embodiment of the invention.

FIG. 3 is a schematic representation of a component of an alternative embodiment of this invention, relating specifically to the contact that needs to be made between the plug 30 and the PCB 32. In FIG. 3, the PCB is schematically represented by the partly broken-away board 38 supporting a plurality of electronic contact pads 40. In the Figure, the block 44 has a cylindrical bore 46 extending perpendicularly away from the face 48 of the block 44, i.e. parallel to the side wall designated by the numeral 50.

Extending downwardly from the bore 46 is a slot 52 with parallel walls, and within the slot is shown an elastomeric connector which is made up of alternating layers of conductive and non-conductive silicone rubber, represented within the opening for the bore 46 by alternating white and black curved lines (the curve matches the periphery of the bore 46). As is well known, electrical contact is made by "sandwiching" the elastomeric elements between substrata to be interconnected. These components are often called "zebra strips" for obvious reasons.

It is easy to visualize how the zebra strip connector 54 shown in FIG. 3 could replace the three upstanding posts 35, 36 and 37 in FIG. 4. The individual silicon layers in such a zebra strip would extend perpendicular to the paper in FIG. 4.

It is thus seen that the modification provided by this invention allows easy access for switching between the internal mike and the external mike, since the opening 14 is located at the front of the telephone set. Also, the present invention requires minimal modification to the plastic components of the telephone set. Further, the structure of this invention permits the switching of circuitry to accommodate the required changes. Thus, when the plug 30 is removed from the opening 14 (46) the internal microphone 22 is in operation, whereas when the plug 30 is inserted into the opening 14 (46), sound is prevented from reaching the on-board microphone 22, but the auxiliary microphone 15 becomes immediately operable by way of the plug 30 and the contacts 35, 36 and 37 (or the zebra strip 54).

Further, with this invention, the same housing can be used for regular half-duplex phones.

It should be mentioned that, although the insertion of the plug 30 will substantially block off any external pick-up, it could be beneficial to allow trace amounts of the signal to reach the on-board microphone 22, for feedback purposes.

It should be further pointed out that the contacts 35, 36 and 37 could be utilized for other devices, such as infra-red LED'S.

Although a three-contact plug 30 is shown in FIG. 4, a two-conductor plug could be employed. The contact closure which would result between 35 and 36 could be used to reconfigure hardware differently, (change algorithm, disable microphone, etc.).

While two embodiments of this invention have been illustrated in the accompanying drawings and described hereinabove, it will be evident to those skilled in the art that changes and modifications may be made therein, without departing from the essence of this invention, as set forth in the appended claims.

The embodiment of the invention in which an exclusive property or privilege is claimed are defined as follows:

1. In a telephone set which includes a microphone housing defining an opening which communicates with a cavity in the microphone housing within which is located an internal microphone, and leads connecting the internal microphone with a PCB, the improvement comprising:

an external microphone connected to a plug which is receivable snugly within said opening, thereby to substantially block external sound from reaching said internal microphone, and contact means linking the PCB with portions of the plug and thus with the external microphone.

2. The improvement claimed in claim 1, in which said contact means comprises at least two contact posts in electrical communication with the PCB and adapted to make electrical contact with portions of the plug.

3. The improvement claimed in claim 1, in which said contact means comprises a low-impedance zebra strip connector linking the plug to the PCB.

4. In combination:

a telephone set which includes a microphone housing defining an opening which communicates with a cavity in the microphone housing, an internal microphone located in said cavity, leads connecting the internal microphone with a PCB, and an external microphone connected to a plug receivable snugly within said opening, thereby to substantially block external sound from reaching the internal microphone, and contact means linking the PCB with portions of the plug, and thus with the external microphone.

5. The combination claimed in claim 4, in which said contact means comprises at least two contact posts in electrical communication with the PCB and adapted to make electrical contact with portions of the plug.

6. The combination claimed in claim 4, in which said contact means comprises a low-impedance zebra strip connector linking the plug to the PCB.

7. A method of increasing the microphone options for a telephone set, the telephone set including a microphone housing defining an opening which communicates the exterior with a cavity in the microphone housing within which is located an internal microphone, and leads connecting the internal microphone with a PCB, said method including:

a) providing an external microphone connected to a plug which is receivable within said opening snugly enough to substantially block external sound from reaching said internal microphone, b) providing contact means for linking the PCB with portions of the plug and thus with the external microphone, c) inserting the plug into the opening whenever it is desired to use said external microphone; and d) removing the plug from the opening whenever it is desired to use said internal microphone.

8. The method claimed in claim 7, in which said contact means comprises at least two contact posts in electrical communication with the PCB and adapted to make electrical contact with portions of the plug.

9. The method claimed in claim 7, in which said contact means comprises a low-impedance zebra strip connector linking the plug to the PCB.

* * * * *